United States Patent
Murase et al.

(10) Patent No.: US 7,756,793 B2
(45) Date of Patent: Jul. 13, 2010

(54) CONTENT DATA SUPPLY SYSTEM, CONTENT DATA SUPPLY APPARATUS AND METHOD, CONTENT DATA REPRODUCTION APPARATUS AND METHOD, AND PROGRAM

(75) Inventors: Yasuhiro Murase, Tokyo (JP); Takeshi Iwatsu, Kanagawa (JP); Noriyuki Sakoh, Kanagawa (JP)

(73) Assignee: SONY Corporation, Tokyo (JP)

( * ) Notice: Subject to any disclaimer, the term of this patent is extended or adjusted under 35 U.S.C. 154(b) by 980 days.

(21) Appl. No.: 11/132,073

(22) Filed: May 18, 2005

(65) Prior Publication Data

US 2005/0273446 A1 Dec. 8, 2005

(30) Foreign Application Priority Data

May 19, 2004 (JP) .......................... P2004-149029

(51) Int. Cl.
G06F 17/60 (2006.01)
H04K 1/00 (2006.01)
H04L 9/00 (2006.01)

(52) U.S. Cl. .......................................... 705/59; 705/52

(58) Field of Classification Search ........................ None
See application file for complete search history.

(56) References Cited

U.S. PATENT DOCUMENTS

| 6,477,507 | B2 * | 11/2002 | Sugimori ...................... 705/26 |
| 6,502,124 | B1 * | 12/2002 | Shimakawa et al. .......... 709/203 |
| 7,167,896 | B2 * | 1/2007 | Hasegawa et al. ............ 709/203 |
| 2002/0038246 | A1 * | 3/2002 | Nagaishi ...................... 705/14 |
| 2002/0046174 | A1 * | 4/2002 | Sugimori ...................... 705/51 |
| 2002/0053090 | A1 * | 5/2002 | Okayama et al. ............. 725/152 |
| 2003/0200458 | A1 * | 10/2003 | Hori et al. .................... 713/200 |
| 2006/0190320 | A1 * | 8/2006 | Dewa ........................... 705/14 |

FOREIGN PATENT DOCUMENTS

| EP | 1 164 748 | 12/2001 |
| EP | 1 209 854 | 5/2002 |
| JP | 03-252818 | 11/1991 |
| JP | 07-049787 | 2/1995 |
| JP | 2000-331090 | 11/2000 |
| JP | 2001-256195 | 9/2001 |

(Continued)

OTHER PUBLICATIONS

Technical Standard: "System Management: Software License Use Management (XSLM)" Software License Use Management (XSLM), Mar. 1999, pp. 25-29, 175, XP002271896.

*Primary Examiner*—Andrew J. Fischer
*Assistant Examiner*—C. Aaron McIntyre
(74) *Attorney, Agent, or Firm*—Finnegan, Henderson Farabow, Garrett & Dunner LLP

(57) ABSTRACT

The present invention is to provides a content data supply system, a content data supply apparatus and method, a content data reproduction apparatus and method, and a program. The content supply system supplies content data from a content data supply apparatus to a content reproduction apparatus via a network. The content reproduction apparatus includes notification means, content list acquisition means, activation file acquisition means, content data acquisition means, and license data acquisition means. The content data supply apparatus includes customer information management means, content list generation means, activation file generation means, storage means, content data supply means, and license data supply means.

4 Claims, 9 Drawing Sheets

FOREIGN PATENT DOCUMENTS

| | | |
|---|---|---|
| JP | 2002-189609 | 7/2002 |
| JP | 2002-279204 | 9/2002 |
| JP | 2003-006100 | 1/2003 |
| JP | 2003-058450 | 2/2003 |
| JP | 2003-124921 | 4/2003 |

* cited by examiner

FIG. 3

| USER ID | PASSWORD | NICKNAME (TERMINAL NAME) | BILLING ID | MUSIC KEY NUMBER | CONTENT ID | DL COMPLETION FLAG (0/1) | NUMBER OF POSSIBLE RECOVERIES (INITIAL VALUE:0) | NUMBER OF EXECUTED RECOVERIES |
|---|---|---|---|---|---|---|---|---|
| XYZ1234 | 123ABC | MODEL X1 | 3675869388262 | L2345X | ZX00001 | 1 | 0 | 0 |
| | | | | | ZX00002 | 1 | 0 | 0 |
| | | | | | ZX00003 | 0 | 0 | 0 |
| | | | | | ZX00004 | 1 | 0 | 0 |
| | | | 9796854733265 | B4321S | KJ00037 | 0 | 0 | 0 |
| | | | 3267320977867 | G5802F | XJ00040 | 1 | 0 | 0 |

FIG. 6

```
<InitFile>
  <request>
    <usageright>
        <SID>070200</SID>
        <URL>http://www.ABC.co.jp/usage</URL>
        <UID>KJ00037<UID>
        <TID>020101010102</TID>
        <bindID>00000001</bindID>
    </usageright>
    <content>
        <CID>KJ00037</CID>
        <URL>http://ABC.co.jp/0702000000000001.OMA</URL>
        <LENGTH>5C9710</LENGTH>
    </content>
         ⋮
  </request>
</InitFile>
```

FIG.7

```
<ListFile>
    <List>
            <ContensID>KJ00037</ContensID>
            <DLFlag>1</DLFlag>
    </List>
    <List>
            <ContensID>XJ00040</ContensID>
            <DLFlag>0</DLFlag>
    </List>
     ⋮
</ListFile>
```

CONTENT DATA SUPPLY SYSTEM, CONTENT DATA SUPPLY APPARATUS AND METHOD, CONTENT DATA REPRODUCTION APPARATUS AND METHOD, AND PROGRAM

CROSS REFERENCES TO RELATED APPLICATIONS

The present invention contains subject matter related to Japanese Patent Application JP 2004-149029 filed in the Japanese Patent Office on May 19, 2004, the entire contents of which being incorporated herein by reference.

BACKGROUND OF THE INVENTION

The present invention relates to a content data supply system, a content data supply apparatus and method, a content data reproduction apparatus and method, and a program and, in particular, it relates to a content data supply system, a content data supply apparatus and method, a content data reproduction apparatus and method, and a program that are preferably used for trading content data via a network, typically, the Internet.

In the past, there was a system for downloading content data by a personal computer, cellular phone, and the like via a network, typically, the Internet. Further, there was an invention for downloading content data repeatedly if the download had failed. (for example, see Patent Document 1.)

[Patent Document 1]
Japanese Patent Laid-open No. 2001-256195

SUMMARY OF THE INVENTION

However, in the invention set forth in Patent Document 1, if the download of the content data had failed, the user was notified of the failure of the download and prompted to instruct to perform the download again and, the download was performed again in response to the user's instruction. Here, there was a problem in that such procedure was very cumbersome for the user.

Further, in the past, in the case in which the personal computer and the like storing the content data failed after the content data had been downloaded successfully, there was not a technique for allowing the content data to be downloaded again without being billed again.

Therefore, it is desirable that, when the download of the content data has failed, the content data can be downloaded immediately without the need of the user's operation.

According to an embodiment of the present invention, there is provided a content supply system, wherein a content reproduction apparatus includes: notification means for notifying a content data supply apparatus via a network of commodity identification information for identifying a commodity corresponding to a user's commodity selection operation; content list acquisition means for acquiring, from a content data supply apparatus, a content list that is a list of content data included in the commodity and that includes information indicating whether or not the content data has been downloaded completely; activation file acquisition means for acquiring, from the content data supply apparatus, an activation file including a site from which the content data included in the commodity is acquired and a site from which license data associated with the content data is acquired; content data acquisition means for acquiring the content data included in the content list but not downloaded yet from the content data supply apparatus based on the activation file; and license data acquisition means for acquiring the license data associated with the content data included in the content list but not downloaded yet from the content data supply apparatus based on the activation file. The content data supply apparatus includes: customer information management means for managing, for each user of the content reproduction apparatus, customer information including at least content identification information for identifying the content data corresponding to the purchased commodity and download completion flags indicating whether or not the content data corresponding to the purchased commodity has been downloaded completely; content list generation means for generating the content list based on the commodity identification information notified from the content reproduction apparatus and with reference to the customer information; activation file generation means for generating the activation file based on the commodity identification information notified from the content reproduction apparatus; storage means for storing the activation file generated by the activation file generation means and acquired by the content reproduction apparatus; content data supply means for downloading the content data to the content reproduction apparatus; and license data supply means for downloading the license data to the content reproduction apparatus.

According to an embodiment of the present invention, there is provided a first content supply method including the steps of: notifying, in a content reproduction apparatus, a content data supply apparatus via a network of commodity identification information for identifying a commodity corresponding to a user's commodity selection operation; generating, in a content data supply apparatus, a content list based on the commodity identification information notified from the content reproduction apparatus and with reference to customer information that is managed for each user of the content reproduction apparatus and that includes at least content identification information for identifying content data corresponding to the purchased commodity and download completion flags indicating whether or not the content data corresponding to the purchased commodity has been downloaded completely; generating, in the content data supply apparatus, an activation file including a site from which the content data included in the commodity is acquired and a site from which license data associated with the content data is acquired based on the commodity identification information notified from the content reproduction apparatus; storing, in the content data supply apparatus, the activation file generated in the activation file generation step and acquired by the content reproduction apparatus; acquiring, in the content reproduction apparatus, the content list from the content data supply apparatus; acquiring, in the content reproduction apparatus, the activation file from the content data supply apparatus; acquiring, in the content reproduction apparatus, the content data included in the content list but not downloaded yet from the content data supply apparatus based on the activation file; and acquiring, in the content reproduction apparatus, the license data associated with the content data included in the content list but not downloaded yet from the content data supply apparatus based on the activation file.

According to an embodiment of the present invention, there is provided a content supply apparatus including: management means for managing, for each user of a content reproduction apparatus, customer information including at least content identification information for identifying content data corresponding to a purchased commodity and download completion flags indicating whether or not the content data corresponding to the purchased commodity has been downloaded completely; content list generation means for generating a content list based on commodity identification information notified from the content reproduction apparatus and with reference to the customer information; activation file generation means for generating an activation file including a site from which the content data included in the commodity is acquired and a site from which license data associated with the content data is acquired based on the commodity identification information notified from the content reproduction apparatus; storage means for storing the activation file generated by the activation file generation means and acquired by the content reproduction apparatus; content data supply means for downloading the content data to the content reproduction apparatus; and license data supply means for downloading the license data to the content reproduction apparatus.

According to an embodiment of the present invention, there is provided a second content supply method including the steps of: generating a content list based on commodity identification information notified from a content reproduction apparatus and with reference to customer information that is managed for each user of the content reproduction apparatus and that includes at least content identification information for identifying content data corresponding to a purchased commodity and download completion flags indicating whether or not the content data corresponding to the purchased commodity has been downloaded completely; generating an activation file including a site from which the content data included in the commodity is acquired and a site from which license data associated with the content data is acquired based on the commodity identification information notified from the content reproduction apparatus; storing the activation file generated in the activation file generation step and acquired by the content reproduction apparatus; downloading the content data to the content reproduction apparatus; and downloading the license data to the content reproduction apparatus.

According to an embodiment of the present invention, there is provided a first program allowing a computer to perform a process including the steps of: generating a content list based on commodity identification information notified from a content reproduction apparatus and with reference to customer information that is managed for each user of the content reproduction apparatus and that includes at least content identification information for identifying content data corresponding to a purchased commodity and download completion flags indicating whether or not the content data corresponding to the purchased commodity has been downloaded completely; generating an activation file including a site from which the content data included in the commodity is acquired and a site from which license data associated with the content data is acquired based on the commodity identification information notified from the content reproduction apparatus; storing the activation file generated in the activation file generation step and acquired by the content reproduction apparatus; downloading the content data to the content reproduction apparatus; and downloading the license data to the content reproduction apparatus.

According to an embodiment of the present invention, there is provided a content reproduction apparatus including: notification means for notifying a content data supply apparatus via a network of commodity identification information for identifying a commodity corresponding to a user's commodity selection operation; content list acquisition means for acquiring, from the content data supply apparatus, a content list that is a list of content data included in the commodity and that includes information indicating whether or not the content data has been downloaded completely; activation file acquisition means for acquiring, from the content data supply apparatus, an activation file including a site from which the content data included in the commodity is acquired and a site from which license data associated with the content data is acquired; content data acquisition means for acquiring the content data included in the content list but not downloaded yet from the content data supply apparatus based on the activation file; and license data acquisition means for acquiring the license data associated with the content data included in the content list but not downloaded yet from the content data supply apparatus based on the activation file.

According to an embodiment of the present invention, there is provided a content reproduction method including the steps of: notifying a content data supply apparatus via a network of commodity identification information for identifying a commodity corresponding to a user's commodity selection operation; acquiring, from the content data supply apparatus, a content list that is a list of content data included in the commodity and that includes information indicating whether or not the content data has been downloaded completely; acquiring, from the content data supply apparatus, an activation file including a site from which the content data included in the commodity is acquired and a site from which license data associated with the content data is acquired; acquiring the content data included in the content list but not downloaded yet from the content data supply apparatus based on the activation file; and acquiring the license data associated with the content data included in the content list but not downloaded yet from the content data supply apparatus based on the activation file.

According to an embodiment of the present invention, there is provided a second program allowing a computer to perform a process including the steps of: notifying a content data supply apparatus via a network of commodity identification information for identifying a commodity corresponding to a user's commodity selection operation; acquiring, from the content data supply apparatus, a content list that is a list of content data included in the commodity and that includes information indicating whether or not the content data has been downloaded completely; acquiring, from the content data supply apparatus, an activation file including a site from which the content data included in the commodity is acquired and a site from which license data associated with the content data is acquired; acquiring the content data included in the content list but not downloaded yet from the content data supply apparatus based on the activation file; and acquiring the license data associated with the content data included in the content list but not downloaded yet from the content data supply apparatus based on the activation file.

In the content supply system and method according to an embodiment of the present invention, in the content data supply apparatus, a content list is generated based on commodity identification information notified from the content reproduction apparatus and with reference to the customer information that is managed for each user of the content reproduction apparatus and that includes at least content identification information for identifying content data corresponding to the purchased commodity and download completion flags indicating whether or not the content data corresponding to the purchased commodity has been downloaded completely. On the other hand, in the content data supply apparatus, based on the commodity identification information notified from the content reproduction apparatus, an activation file including a site from which the content data included in the commodity is acquired and a site from which license data associated with the content data is acquired is generated and stored. Then, in the content reproduction apparatus, the content list and the activation file are acquired from the content data supply apparatus. Then, in the content reproduction apparatus, based on the activation file, the content data included in the content list but not downloaded yet and the license data associated therewith are acquired from the content data supply apparatus.

In the content supply apparatus, method, and program according to an embodiment of the present invention, based on the commodity identification information notified from the content reproduction apparatus, a content list is generated with reference to the customer information that is managed for each user of the content reproduction apparatus and that includes at least content identification information for identifying content data corresponding to the purchased commodity and download completion flags indicating whether or not the content data corresponding to the purchased commodity has been downloaded completely. On the other hand, based on the commodity identification information notified from the content reproduction apparatus, an activation file including a site from which the content data included in the commodity is acquired and a site from which license data associated with the content data is acquired is generated and stored.

In the content reproduction apparatus, method, and program according to an embodiment of the present invention, the commodity identification information for identifying a commodity corresponding to a user's commodity selection operation is notified to the content data supply apparatus via a network. A content list that is a list of content data included in the commodity and that includes information indicting whether or not the content data has been downloaded completely is acquired from the content data supply apparatus. An activation file including a site from which the content data included in the commodity is acquired and a site from which license data associated with the content data is acquired is acquired from the content data supply apparatus. Further, based on the activation file, the content data included in the content list but not downloaded yet and the license data associated therewith are acquired from the content data supply apparatus.

According to the present invention, when the download of the content data has failed, the content data can be downloaded immediately without the need of the user's operation.

BRIEF DESCRIPTION OF THE DRAWINGS

FIG. 3 is a diagram showing an example of customer information managed by a customer information management section of FIG. 1;

FIG. 6 is a diagram showing an example of an activation file described using XML;

FIG. 7 is a diagram showing an example of a music list file described using XML;

DETAILED DESCRIPTION OF THE PREFERRED EMBODIMENTS

Figure 1:
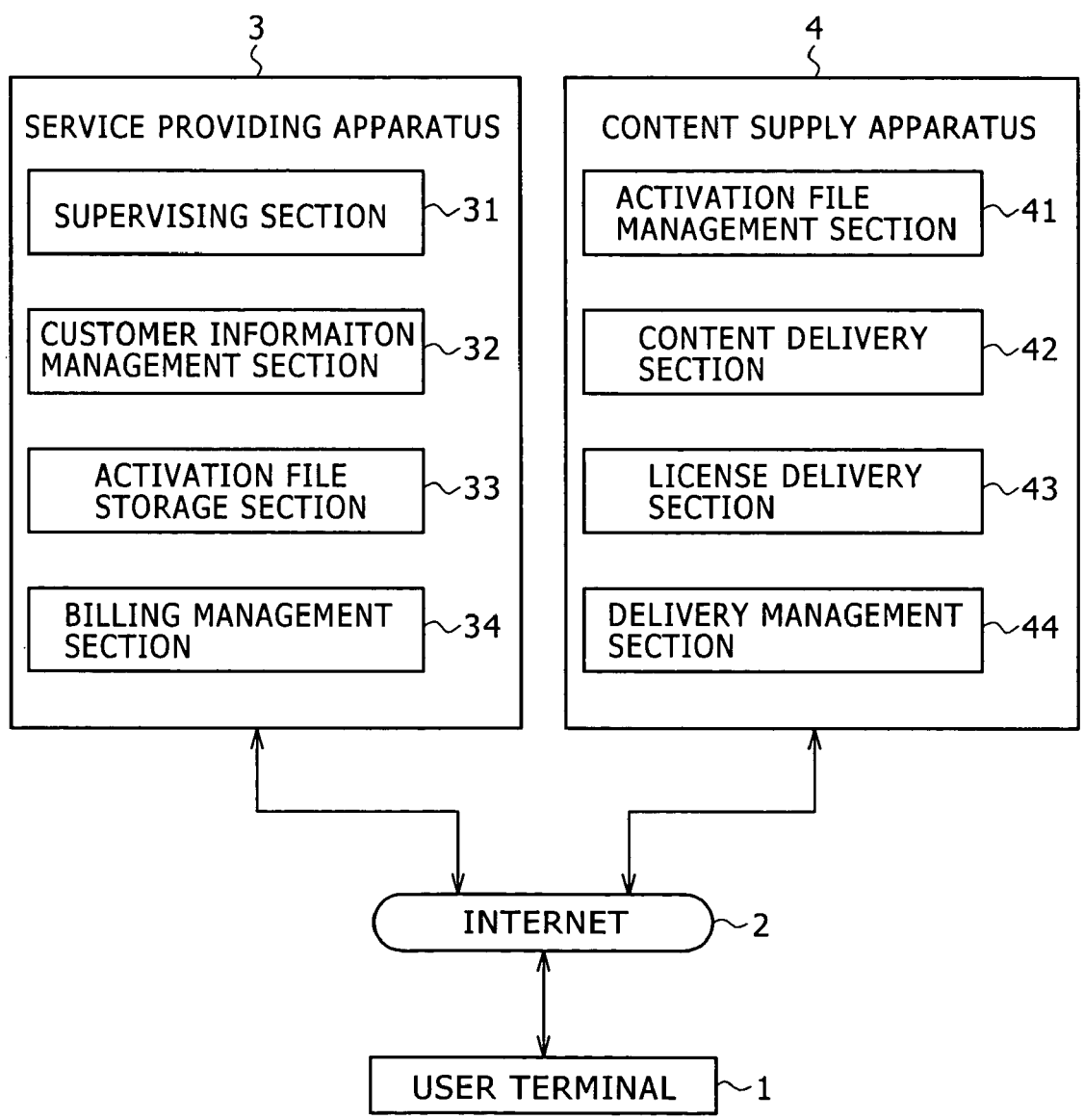
FIG. 1 is a block diagram showing an exemplary configuration of a content supply system according to an embodiment of the present invention.

Embodiments of the present invention will be described below. The correlation between the constituent features set forth in claims and specific examples in the embodiments is exemplified as follows. This exemplification is intended to make sure that the specific examples set forth in the claims and supporting the invention are also set forth in the embodiments of the invention. Therefore, even if there is a particular example set forth in the embodiments of the present invention but not set forth here as that corresponding to a constituent feature, it does not denote that this particular example does not correspond to the constituent feature. Conversely, even if a particular example is set forth here as that corresponding to a constituent feature, it does not denote that this particular example does not correspond to any other constituent features than that constituent features.

Further, this exemplification does not denote that the invention corresponding to the specific examples set forth in the embodiments of the invention is included in the claims completely. In other words, this exemplification is about the invention corresponding to a particular example set forth in the embodiments and does not deny the existence of any invention that is not set forth in the claims herein, namely the existence of any invention that will be divisionally applied or added by amendment in the future.

In a content supply system according to an embodiment of the present invention (for example, a content supply system in FIG. 1), a content reproduction apparatus (for example, a user terminal 1 in FIG. 1) includes:

notification means (for example, a communication section 58 in FIG. 2) for notifying a content data supply apparatus via a network of commodity identification information for identifying a commodity corresponding to a user's commodity selection operation;

content list acquisition means (for example, a music list file acquisition section 54 in FIG. 2) for acquiring, from the content data supply apparatus, a content list that is a list of content data included in the commodity and that includes information indicating whether or not the content data has been downloaded completely;

activation file acquisition means (for example, an activation file acquisition section 55 in FIG. 2) for acquiring, from the content data supply apparatus, an activation file including a site from which the content data included in the commodity is acquired and a site from which license data associated with the content data is acquired;

content data acquisition means (for example, a content/license acquisition section 56 in FIG. 2) for acquiring the content data included in the content list but not downloaded yet from the content data supply apparatus based on the activation file; and license data acquisition means (for example, a content/license acquisition section 56 in FIG. 2) for acquiring the license data associated with the content data included in the content list but not downloaded yet from the content data supply apparatus based on the activation file.

The content data supply apparatus (for example, a service providing apparatus 3 and a content supply apparatus 4 in FIG. 1) includes:

customer information management means (for example, a customer information management section 32 in FIG. 1)

for managing, for each user of the content reproduction apparatus, customer information including at least content identification information for identifying the content data corresponding to the purchased commodity and download completion flags indicating whether or not the content data corresponding to the purchased commodity has been downloaded completely;

content list generation means (for example, a supervising section 31 in FIG. 1) for generating the content list based on the commodity identification information notified from the content reproduction apparatus and with reference to the customer information;

activation file generation means (for example, an activation file management section 41 in FIG. 1) for generating the activation file based on the commodity identification information notified from the content reproduction apparatus;

storage means (for example, an activation file storage section 33 in FIG. 1) for storing the activation file generated by the activation file generation means and acquired by the content reproduction apparatus;

content data supply means (for example, a content delivery section 42 in FIG. 1) for downloading the content data to the content reproduction apparatus; and license data supply means (for example, a license delivery section 43 in FIG. 1) for downloading the license data to the content reproduction apparatus.

A content supply method according to an embodiment of the present invention includes the steps of:

notifying (for example, step S2 in FIG. 4), in a content reproduction apparatus (for example, a user terminal 1 in FIG. 1), a content data supply apparatus (for example, a service providing apparatus 3 and a content supply apparatus 4 in FIG. 1) via a network of commodity identification information for identifying a commodity corresponding to a user's commodity selection operation;

generating (for example, step S24 in FIG. 4), in a content data supply apparatus, a content list based on the commodity identification information notified from the content reproduction apparatus and with reference to customer information that is managed for each user of the content reproduction apparatus and that includes at least content identification information for identifying content data corresponding to the purchased commodity and download completion flags indicating whether or not the content data corresponding to the purchased commodity has been downloaded completely;

generating (for example, step S51 in FIG. 4), in the content data supply apparatus, an activation file including a site from which the content data included in the commodity is acquired and a site from which license data associated with the content data is acquired based on the commodity identification information notified from the content reproduction apparatus;

storing (for example, step S23 in FIG. 4), in the content data supply apparatus, the activation file generated in the activation file generation step and acquired by the content reproduction apparatus;

acquiring (for example, step S25 in FIG. 4), in the content reproduction apparatus, the content list from the content data supply apparatus;

acquiring (for example, step S26 in FIG. 4), in the content reproduction apparatus, the activation file from the content data supply apparatus;

acquiring (for example, step S53 in FIG. 4), in the content reproduction apparatus, the content data included in the content list but not downloaded yet from the content data supply apparatus based on the activation file; and acquiring (for example, step S56 in FIG. 4), in the content reproduction apparatus, the license data associated with the content data included in the content list but not downloaded yet from the content data supply apparatus based on the activation file.

A content supply apparatus (for example, a service providing apparatus 3 and the content supply apparatus 4 in FIG. 1) according to an embodiment of the present invention includes:

management means (for example, a customer information management section 32 in FIG. 1) for managing, for each user of a content reproduction apparatus (for example, a user terminal 1 in FIG. 1), customer information including at least content identification information for identifying content data corresponding to a purchased commodity and download completion flags indicating whether or not the content data corresponding to the purchased commodity has been downloaded completely;

content list generation means (for example, a supervising section 31 in FIG. 1) for generating a content list based on commodity identification information notified from the content reproduction apparatus and with reference to the customer information;

activation file generation means (for example, an activation file management section 41 in FIG. 1) for generating the activation file including a site from which the content data included in the commodity is acquired and a site from which license data associated with the content data is acquired based on the commodity identification information notified from the content reproduction apparatus;

storage means (for example, an activation file storage section 33 in FIG. 1) for storing the activation file generated by the activation file generation means and acquired by the content reproduction apparatus;

content data supply means (for example, a content delivery section 42 in FIG. 1) for downloading the content data to the content reproduction apparatus; and license data supply means (for example, a license delivery section 43 in FIG. 1) for downloading the license data to the content reproduction apparatus.

A content supply method according to an embodiment of the present invention includes the steps of:

generating (for example, step S24 in FIG. 4) a content list based on commodity identification information notified from a content reproduction apparatus (for example, a user terminal 1 in FIG. 1) and with reference to customer information that is managed for each user of the content reproduction apparatus and that includes at least content identification information for identifying content data corresponding to a purchased commodity and download completion flags indicating whether or not the content data corresponding to the purchased commodity has been downloaded completely;

generating (for example, step S51 in FIG. 4) an activation file including a site from which the content data included in the commodity is acquired and a site from which license data associated with the content data is acquired based on the commodity identification information notified from the content reproduction apparatus;

storing (for example, step S23 in FIG. 4) the activation file generated in the activation file generation step and acquired by the content reproduction apparatus;

downloading (for example, step S53 in FIG. 4) the content data to the content reproduction apparatus; and downloading (for example, step S56 in FIG. 4) the license data to the content reproduction apparatus.

A content reproduction apparatus (for example, a user terminal 1 in FIG. 1) according to an embodiment of the present invention includes:

notification means (for example, a communication section 58 in FIG. 2) for notifying a content data supply apparatus via a network of commodity identification information for identifying a commodity corresponding to a user's commodity selection operation;

content list acquisition means (for example, a music list file acquisition section 54 in FIG. 2) for acquiring, from the content data supply apparatus, a content list that is a list of content data included in the commodity and that includes information indicating whether or not the content data has been downloaded completely;

activation file acquisition means (for example, an activation file acquisition section 55 in FIG. 2) for acquiring, from the content data supply apparatus, an activation file including a site from which the content data included in the commodity is acquired and a site from which license data associated with the content data is acquired;

content data acquisition means (for example, a content/license acquisition section 56 in FIG. 2) for acquiring the content data included in the content list but not downloaded yet from the content data supply apparatus based on the activation file; and license data acquisition means (for example, a content/license acquisition section 56 in FIG. 2) for acquiring the license data associated with the content data included in the content list but not downloaded yet from the content data supply apparatus based on the activation file.

A content reproduction method according to an embodiment of the present invention includes the steps of:

notifying (for example, step S2 in FIG. 4) a content data supply apparatus via a network of commodity identification information for identifying a commodity corresponding to a user's commodity selection operation;

acquiring (for example, step S25 in FIG. 4), from the content data supply apparatus, a content list that is a list of content data included in the commodity and that includes information indicating whether or not the content data has been downloaded completely;

acquiring (for example, step S26 in FIG. 4), from the content data supply apparatus, an activation file including a site from which the content data included in the commodity is acquired and a site from which license data associated with the content data is acquired;

acquiring (for example, step S53 in FIG. 4) the content data included in the content list but not downloaded yet from the content data supply apparatus based on the activation file; and acquiring (for example, step S56 in FIG. 4) the license data associated with the content data included in the content list but not downloaded yet from the content data supply apparatus based on the activation file.

Here, it is to be noted that the correlation between the constituent features set forth in program claims of the present invention and the specific examples in the embodiments of the invention is similar to that exemplified above with regard to the content delivery method or the content reproduction method of the invention set forth above, the description of which is omitted.

Hereinafter, specific embodiments to which the present invention is applied will be described in detail with reference to the drawings.

FIG. 1 shows an exemplary configuration of a content supply system according to an embodiment of the present invention. This content supply system is a household electrical appliance and includes a user terminal 1 that reproduces content data (for example, audio data for reproducing music. The content data may be video data for reproducing video, program data for executing specific processes, and the like.), a service providing apparatus 3 that is a server on the Internet 2 for providing a user of the user terminal 1 with service for supplying the content (hereinafter referred to as the "content supply"), and a content supply apparatus 4 that supplies the user terminal 1 with the content data and license data required for reproducing such content data.

The user terminal 1 connects with the service providing apparatus 3 via the Internet 2 to transmit various information for acquiring content delivery service (user authentication information, billing information, and the like). Further, the user terminal 1 connects with the content supply apparatus 4 via the Internet 2 to download the content data and the corresponding license data. The user terminal 1 stores the downloaded content data and license data and reads and reproduces the stored content data. Here, the user terminal 1 is also operable to browse web pages established on any servers on the Internet 2 and to send/receive e-mails. Further, the user terminal 1 may be operable to receive and reproduce radio and TV broadcasts and reproduce content data recorded on recording media such as DVD (Digital Versatile Discs), CD (Compact Discs), and MD (Mini Discs).

In the service providing apparatus 3, a supervising section 31 accepts access from the user terminal 1 via the Internet 2 and sends HTML (Hypertext Markup Language) data and the like for displaying web pages and the like where content data can be purchased. Further, in response to requests from the user terminal 1, the supervising section 31 controls each section of the service providing apparatus 3 and requests each section of the content supply apparatus 4 to perform specified operations. Still further, the supervising section 31 supplies the user terminal 1 with an activation file generated by an activation file management section 41 in the content supply apparatus 4. (The activation file will be described in detail below with reference to FIG. 6.) This activation file includes information indicating the site from which the content data purchased by the user of the user terminal 1 (downloaded by the user terminal 1) is downloaded and the site from which the corresponding license data is downloaded.

Still further, based on customer information managed by a customer information management section 32, the supervising section 31 generates a music list file that is a file of the content data purchased by the user of the user terminal 1 (downloaded by the user terminal 1) and supplies it to the user terminal 1. (The music list file will be described in detail below with reference to FIG. 7.) This music list file includes content identification information for identifying the content data and information indicating whether or not the content data and the corresponding license data has been downloaded properly.

The customer information management section 32 keeps and updates information about the user of the user terminal 1 (the customer of this content supply system). (This information will be hereinafter referred to as the "customer information". It will be described in detail below with reference to FIG. 3.) Further, the customer information management section 32 keeps download historical information of the license data (a license download log) with regard to the user terminal 1. An activation file storage section 33 stores the activation files generated by activation file management section 41 based on control by the supervising section 31 and deletes the stored activation files in response to requests from the supervising section 31. A billing management section 34 manages the amount charged to the user of the user terminal 1 (the customer of this content supply system) and the like.

In the content supply apparatus 4, based on requests from the supervising section 31, the activation file management section 41 generates the activation files for purchase, recovery, and the like. In response to requests from the user terminal 1, the content delivery section 42 delivers (downloads) the content data via the Internet 2. A delivery management section 44 notifies the customer information management section 32 of sale confirmation. Further, the delivery management section 44 notifies the customer information management section 32 of delivery completion of the content data and the license data.

Figure 2:
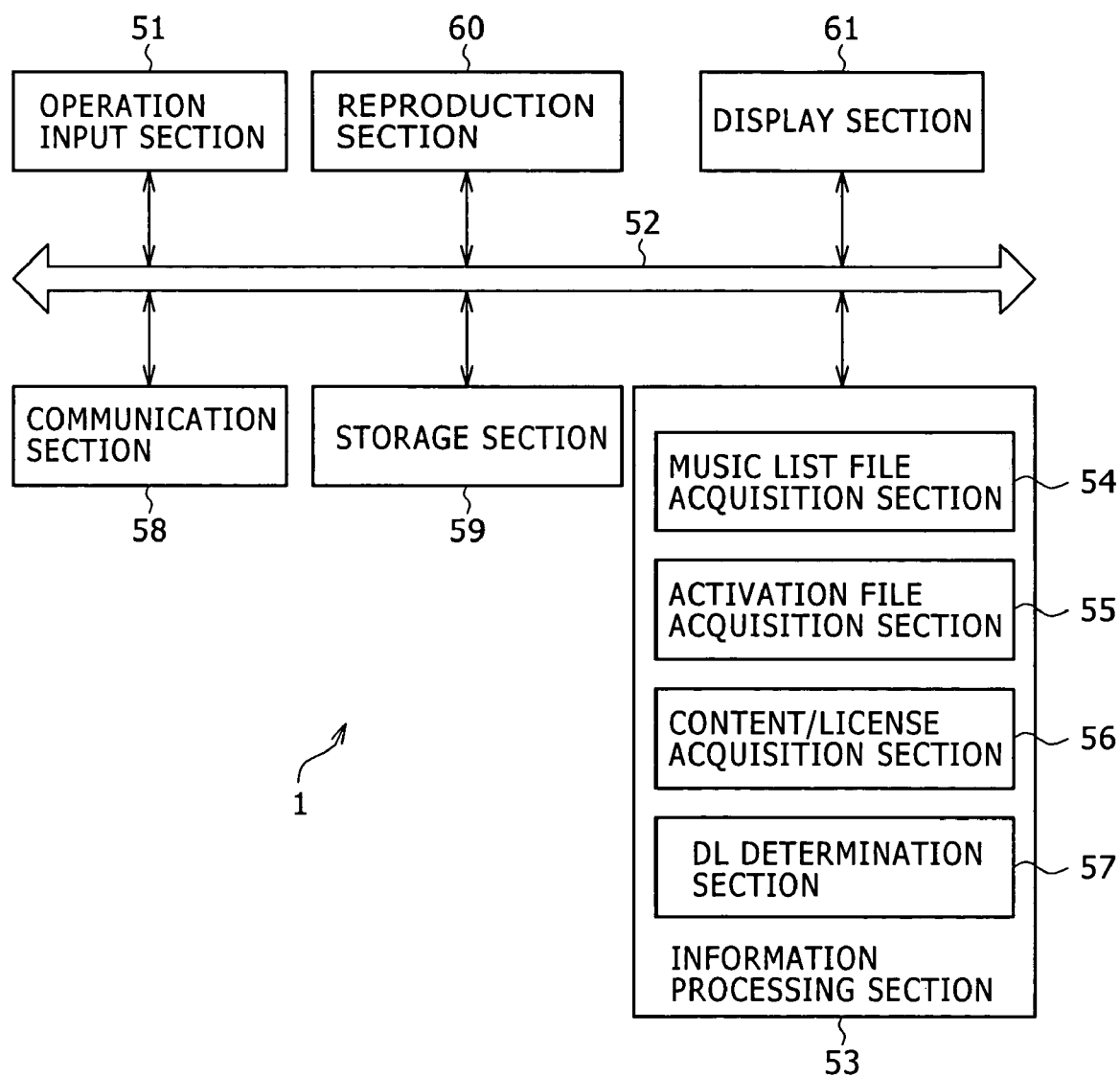
FIG. 2 is a block diagram showing an exemplary configuration of a user terminal of FIG. 1.

FIG. 2 shows an exemplary configuration of the user terminal 1 in detail. Based on the user's operation, an operation input section 51 generates control signal and supplies the generated control signal to corresponding sections of the user terminal 1 via a bus line 52. An information processing section 53 processes HTML data and the like acquired by a communication section 58 and outputs resulted video signal to a display section 61. Further, the information processing section 53 includes a music list file acquisition section 54, an activation file acquisition section 55, a content/license acquisition section 56, and a download (DL) determination section 57 therein and uses these included sections to perform processing for acquiring the content data and the license data.

The music list file acquisition section 54 acquires and keeps the music list file from the supervising section 31 of the service providing apparatus 3 via the bus line 52 and the communication section 58. The activation file acquisition section 55 acquires and keeps the activation file from the supervising section 31 of the service providing apparatus 3 via the bus line 52 and the communication section 58. Based on the activation file kept by the activation file acquisition section 55, the content/license acquisition section 56 acquires the content data from the content delivery section 42 of the content supply apparatus 4 and acquires the license data from the license delivery section 43 via the bus line 52 and the communication section 58. The download determination section 57 determines whether or not the content data has been downloaded properly by the content/license acquisition section 56.

The communication section 58 connects with the service providing apparatus 3, the content supply apparatus 4, or arbitrary servers via the Internet 2 to transmit various data. For example, based on the user's operation for purchasing the content that is input to the operation input section 51, the communication section 58 transmits the information about the content purchase to the supervising section 31 of the service providing apparatus 3 via the Internet 2.

A storage section 59 stores the content data and license data acquired by the content/license acquisition section 56. According to the control signal from the operation input section 51 based on the user's operation, a reproduction section 60 reads and reproduces the content data stored in the storage section 59 and outputs the resulting sound signal through a speaker (not shown). Based on the video signal input from the information processing section 53, the display section 61 displays web pages and the like for purchasing the content.

FIG. 3 shows an example of customer information managed by the customer information management section 32 of the service providing apparatus 3. In the customer information, a user ID, a password, a nickname, billing IDs, music key numbers, content IDs, download (DL) completion flags, the number of possible recoveries, and the number of executed recoveries are managed in association with one another.

The user ID is identification information for uniquely identifying the user of the user terminal 1. The password is information that is known only by the user and that certifies that the operation is performed by the user himself/herself. The nickname is a name of the terminal 1 given by the user. However, it is not permitted to give a plurality of nicknames to one identical terminal. Therefore, when family members (a plurality of users) share one user terminal 1 in households, a plurality of user IDs may be associated with one nickname.

The billing IDs are information for identifying payment completion information that is generated when the user purchases a package (a purchase unit of the content data). The package (purchase unit) may include the content data for one musical piece or it may include the content data for a plurality of musical pieces (for example, in an album). For example, when the user purchases a package of an album including a plurality of content data, an identical billing ID is associated with the plurality of content data included in the album.

The music key numbers are associated with the billing IDs in a one-to-one relationship. When the user purchases the package (purchase unit of the content data) and completes the payment, the user is notified the music key number via an e-mail and the like.

The content IDs are information for identifying the content data purchased by the user. For example, when the user purchases a package of an album including content data for 10 musical pieces, 10 content IDs are added and associated with one billing ID.

The download completion flags are information that are associated with the content IDs and that are flags indicating whether or not the content data associated with the content IDs and the license data associated with such content data has been downloaded properly. A download completion flag set to 0 indicates that the download has been completed properly. On the other hand, a download completion flag set to 1 indicates that the download has not been completed properly.

The number of possible recoveries is information associated with the content IDs and indicates how many times the download of the content data and license data without repurchase (hereinafter referred to as the "recovery") is permitted, for example, when the content data associated with a content ID and the license data associated with such content data has been downloaded properly but, after that, the downloaded content data and license data has been deleted due to failure of the user terminal 1 or other problems. Its initial value is 0. When the user sends a request for recovery, the operator of the service providing apparatus 3 increments by 1 the number of possible recoveries associated with the content IDs of all content data purchased by such user.

The number of executed recoveries is information associated with the content IDs and indicates that how many times the recovery of the content data and license data associated with a content ID has been executed. Its initial value is 0. Only when the recovery has been executed successfully, the number of executed recoveries is incremented by 1.

Here, it is to be noted that the number of possible recoveries and the number of executed recoveries may only be incremented but may not be decremented. Therefore, if the number of possible recoveries is equal to the number of executed recoveries, the recovery is not permitted. In contrast, if the number of possible recoveries is larger than the number of executed recoveries by 1, the recovery is permitted. The operator of the service providing apparatus 3 can know how many times the recovery had been executed by checking the number of executed recoveries.

Figure 4:
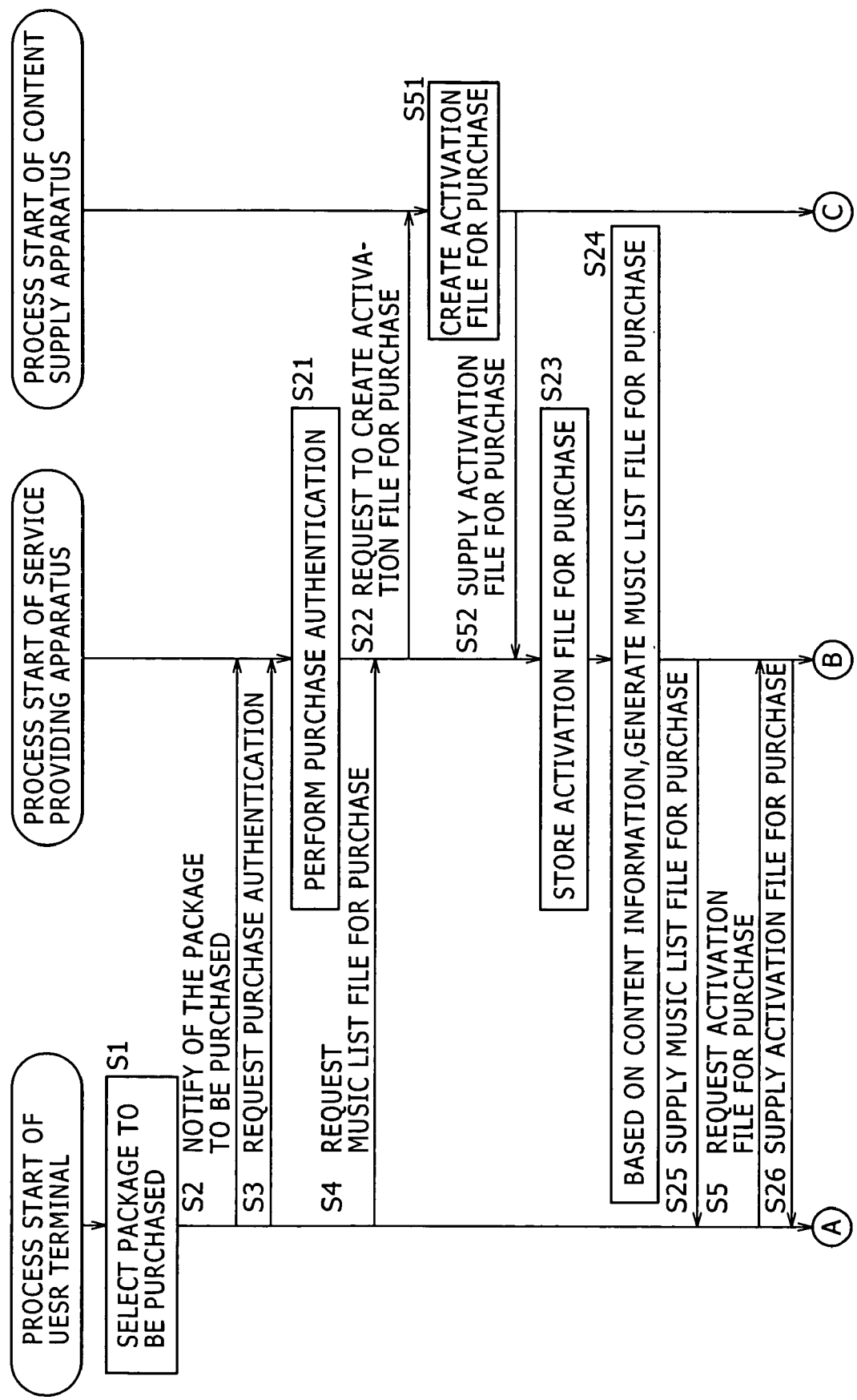
FIG. 4 is the first half of a flow chart for describing operations to purchase content data.

Next, operations of the content supply system when the user of the user terminal 1 purchases contents will be described with reference to a flow chart of FIGS. 4 and 5. Here, it is assumed that the user of the user terminal 1 is a customer of this content supply system and that a user ID and a credit card number for billing have already been registered.

In step S1, according to the user's operation, the user terminal 1 accesses a web page for content purchase established by the service providing apparatus 3 and selects the contents to be purchased. More specifically, the user inputs to the operation input section 51 an operation for accessing the web page for content purchase. Based on this operation, the operation input section 51 outputs the corresponding control signal to the communication section 58. Based on the control signal from the operation input section 51, the communication section 58 accesses the service providing apparatus 3 via the Internet 2 and requests HTML data of the web page for content purchase. In response to this request, the supervising section 31 of the service providing apparatus 3 returns the corresponding HTML data to the user terminal 1 via the Internet 2. Upon receipt of this, the communication section 58 of the user terminal 1 outputs the received HTML data to the information processing section 53. The information processing section 53 generates a video signal corresponding to the input HTML data and outputs the signal to the display section 61. The display section 61 displays the input video signal. On this displayed web page for content purchase, the user selects the contents to be purchased by package unit and inputs his/her user ID and password and the like.

In step S2, via the Internet 2, the communication section 58 of the user terminal 1 notifies the service providing apparatus 3 of the package to be purchased. In response to this, the service providing apparatus 3 notifies the user terminal 1 of the content IDs of the content data included in the package to be purchased.

In step S3, via the Internet 2, the communication section 58 of the user terminal 1 notifies the service providing apparatus 3 of the user ID, the password, the nickname, and the content IDs of the content data included in the package to be purchased and requests purchase authentication.

In response to this request, in step S21, the supervising section 31 of the service providing apparatus 3 notifies the customer information management section 32 of the received user ID, password, nickname, and content IDs of the content data included in the package to be purchased and confirms that the user requesting the content purchase is a registered customer. The customer information management section 32 adds the received content IDs of the content data included in the package to be purchased to the customer information. At this time, the download completion flags associated with each content ID are set to 0 (indicating that the download is not completed).

In step S4, the music list file acquisition section 54 of the user terminal 1 notifies the service providing apparatus 3 via the communication section 58 and the Internet 2 of a request for the music list file for purchase as well as the content IDs of the content data included in the package to be purchased.

In response to this notification, in step S22, the supervising section 31 of the service providing apparatus 3 notifies the content supply apparatus 4 via the Internet 2 of the content IDs and requests to create an activation file for purchase. In response to this request, in step S51, the activation file management section 41 of the content supply apparatus 4 creates the activation file for purchase.

This activation file for purchase is information used by the user terminal 1 to download the purchased content data and corresponding license. As shown in FIG. 6, for example, this activation file for purchase is described using XML (Extensible Markup Language).

The activation file for purchase includes one or more content IDs of the content data included in the package to be purchased (CID in FIG. 6), a URL (Uniform Resource Locator) of the site to be accessed for downloading such content data (namely, the content delivery section 42 of the content supply apparatus 4), data lengths of such content data (LENGTH in FIG. 6), identification information for identifying the license data necessary for reproducing such content data (SID in FIG. 6), and a URL of the site to be accessed for downloading such license data (namely, the license delivery section 43 of the content supply apparatus 4). The number of each item is equal to the number of the content data included in the package to be purchased.

Returning to FIG. 4, in step S52, the activation file management section 41 of the content supply apparatus 4 supplies the generated activation file for purchase to the supervising section 31 of the service providing apparatus 3 via the Internet 2. In step S23, the supervising section 31 outputs the received activation file for purchase along with the user ID and other information to the activation file storage section 33 requesting to store the activation file and other information. In response to this request, the activation file storage section 33 stores the activation file for purchase in association with the user ID.

In step S24, the supervising section 31 notifies the customer information management section 32 of the user ID and other information and requests to notify of the status of the download of the content data included in the package to be purchased by the user (namely, the status of the download completion flags. Hereinafter, it will be referred to as the "content information".) In response to this request, the customer information management section 32 notifies the supervising section 31 of the content information. Based on the content information notified from the customer information management section 32, the supervising section 31 generates the music list file for purchase.

This music list file for purchase is information used by the user terminal 1 to download the purchased content data and corresponding license. As shown in FIG. 7, for example, this music list file for purchase is described using XML.

The music list file for purchase includes all content IDs of the content data included in the package to be purchased (Contents ID in FIG. 7), and a flag indicating whether or not such content data has been downloaded (DLFlag in FIG. 7. The value 0 indicates that the download has been completed and the value 1 indicates that the download has not been completed.)

Returning to FIG. 4, in step S25, the supervising section 31 supplies the music list file for purchase generated in step S24 to the user terminal 1 via the Internet 2. The supplied music list file for purchase is stored in the music list file acquisition section 54.

In step S5, the activation file acquisition section 55 of the user terminal 1 notifies the service providing apparatus 3 via the communication section 58 and the Internet 2 of the identification information of the package to be purchased and requests the activation file for purchase.

In response to this notification, in step S26, the supervising section 31 of the service providing apparatus 3 supplies the activation file for purchase, which is generated by the content supply apparatus 4 and stored in the activation file storage section 33, to the user terminal 1 via the Internet 2. The supplied activation file for purchase is stored in the activation file acquisition section 55.

Figure 5:
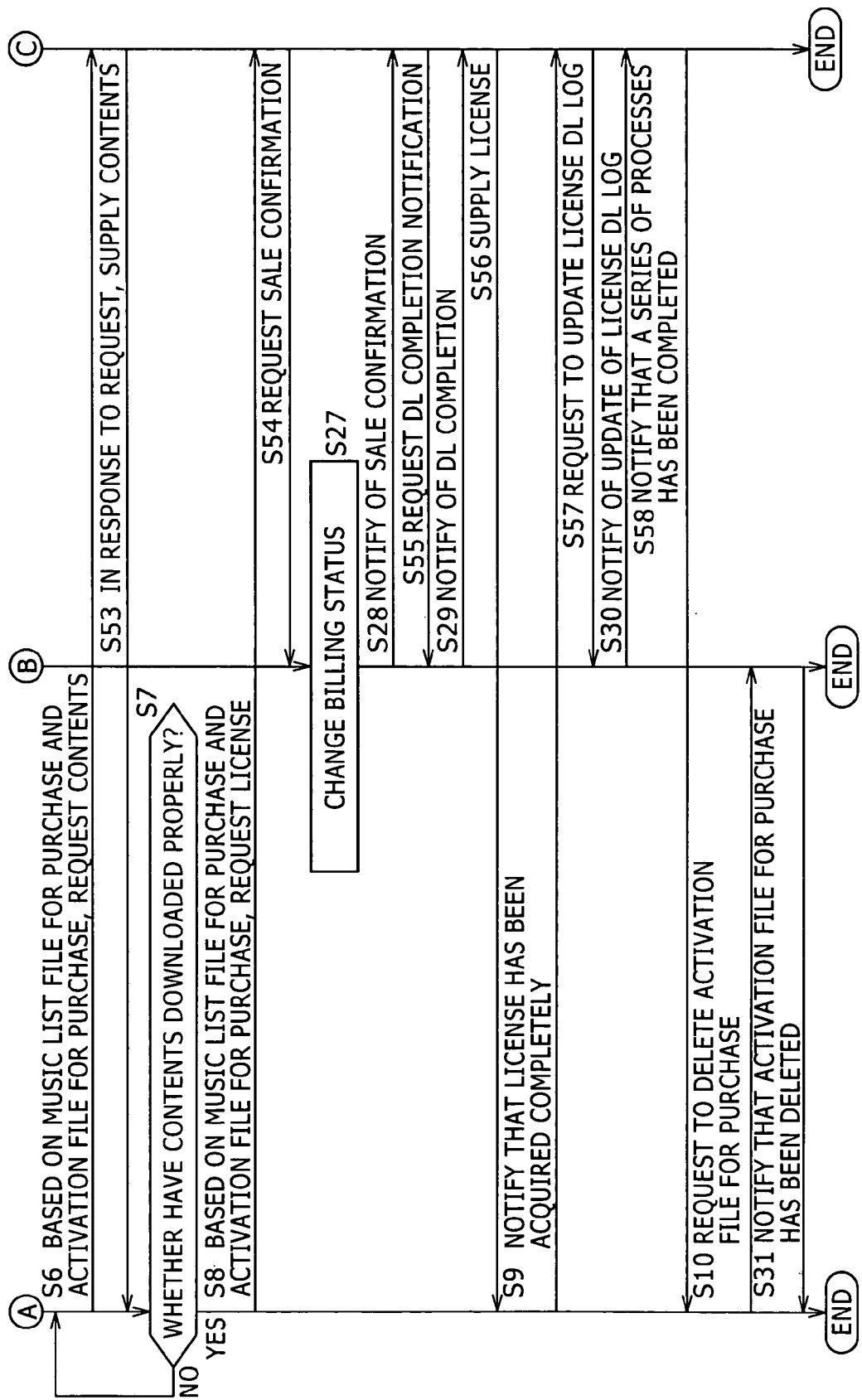
FIG. 5 is the second half of the flow chart for describing operations to purchase content data.

The process proceeds to the second half of the flow chart of FIG. 5. In step S6, the content/license acquisition section 56 of the user terminal 1 accesses the URL for downloading the content data that is described in the activation file for purchase (namely, the content delivery section 42 of the content supply apparatus 4) to request the content data that has the content IDs described in the music list file for purchase and that has not been downloaded. In response to this request, in step S53, the content delivery section 42 of the content supply apparatus 4 supplies (downloads) the requested content data to the user terminal 1 a via the Internet 2. The downloaded content data is stored in the storage section 59 of the user terminal 1.

In step S7, the download determination section 57 of the user terminal 1 determines whether or not the content data requested in step S6 has been downloaded properly. If it is determined that the content data requested in step S6 has not been downloaded properly, the process returns to step S6 and repeats the operations after step S6.

In step S7, if it is determined that the content data requested in step S6 has been downloaded properly, the process proceeds to step S8. In step S8, the content/license acquisition section 56 of the user terminal 1 accesses the URL for downloading the license data that is described in the activation file for purchase (namely, the license delivery section 43 of the content supply apparatus 4) to request the license data associated with the content data that has the content IDs described in the music list file for purchase and that has not been downloaded.

In response to this request, in step S54, the license delivery section 43 of the content supply apparatus 4 requests the sale confirmation (confirmation of billing to the user) to the delivery management section 44. In response to this request, the delivery management section 44 issues and sends the billing ID and corresponding music key numbers to the customer information management section 32 of the service providing apparatus 3 via the Internet 2 to request the sale confirmation.

In response to this request, in step S27, the customer information management section 32 notifies the billing management section 34 of the billing ID to request to change the billing status of the user. In this step, the billing to the user is confirmed.

In step S28, the customer information management section 32 notifies that the sale has been confirmed to the delivery management section 44 of the content supply system 4 via the Internet 2. In response to this notification, in step S55, the delivery management section 44 requests download completion notification (namely, requests to change the download completion flag to 1 and notifies of this change) to the customer information management section 32 via the Internet 2. In response to this request, in step S29, the customer information management section 32 changes the corresponding download completion flag to 1 and, then, returns the download completion notification to the delivery management section 44 via the Internet 2.

In response to this request, in step S56, the delivery management section 44 notifies to the license delivery section 43 that the sale confirmation has been completed. In response to this notification, the license delivery section 43 supplies (downloads) the license data requested in step S6 to the user terminal 1 via the Internet 2. The downloaded license data is stored in the storage section 59 of the user terminal 1.

In step S9, the content/license acquisition section 56 of the user terminal 1 notifies that the license data has been acquired completely to the license delivery section 43 of the content supply apparatus 4 via the communication section 58 and the Internet 2. In response to this notification, in step S57, the license delivery section 43 notifies the delivery management section 44 of the completion of the acquisition of the license data. The delivery management section 44 requests the customer information management section 32 via the Internet 2 to update the license download log. In response to this request, in step S30, the customer information management section 32 updates the license download log and, then, notifies the delivery management section 44 of the content supply apparatus 4 via the Internet 2 of this update. Receiving this notification of the completion of the acquisition of the license data, the delivery management section 44 returns the response to this notification to the license delivery section 43.

Receiving this response, in step S58, the license delivery section 43 notifies that a series of processes to download the content data and license data has been completed to the user terminal 1 via the Internet 2. In response to this notification, in step S10, the activation file acquisition section 55 of the user terminal 1 requests the supervising section 31 of the service providing apparatus 3 via the Internet 2 to delete the activation file for purchase maintained in the service providing apparatus 3. In response to this request, in step S31, based on the control from the supervising section 31, the activation file storage section 33 deletes the stored activation file for purchase. The supervising section 31 notifies that the stored activation file for purchase has been deleted to the user terminal 1 via the Internet 2.

Thus far, the operations of the content supply system when the user of the user terminal 1 purchases the contents have been completed.

When the series of operations described above has been completed, the content supply service provider sends the user of the user terminal 1 an e-mail including information to identify the purchased package (the content ID of the content data and the like), the date of purchase, the nickname, the payment method, the amount, the billing ID, the music key number, and the like. This e-mail may be received by the user terminal 1 or, otherwise, it may be received by other apparatus such as a personal computer. However, the information included in the e-mail, among others, the music key number is important in that it is used for recovery process described below and, therefore, it is desirable to save this information in the personal computer and the like other than the user terminal 1.

In this connection, if the operations are interrupted by any cause such as failure of the user terminal 1 and communication failure of the Internet 2, the processes starting from the step S1 will be performed again. However, in this case, the processes of steps S22, S51, and S52 or, more specifically, the processes in which the service providing apparatus 3 requests the content supply apparatus 4 to create the activation file for purchase and, then, the content supply apparatus 4 creates the activation file for purchase and requests the service providing apparatus 3 to store the activation file are omitted. In this case, the activation file for purchase that has been created in the previous times and stored in the activation file storage section 33 is read out and reused.

Therefore, when the processes starting from step S1 are performed again, the processing time can be reduced by the time required for the processes of steps S22, S51, and S52.

On the other hand, the music list file for purchase is not reused but it is generated every time the processes starting from step S1 are performed. Therefore, if a portion of data has been downloaded properly before the operations are interrupted as described above, a newly generated music list file for purchase reflects this condition. More specifically, in the newly generated music list file for purchase, the download completion flags for the data portion downloaded properly are set to 1. Therefore, it is possible to prevent that the supply of the already downloaded content data is requested uselessly.

Next, a recovery process of the user terminal 1 will be described. The recovery process refers to a process for providing all purchased (downloaded) content data and license data again when the purchased content data and license data has been lost or otherwise damaged due to failure of the user terminal 1 or other problems. Here, it is to be noted that the recovery process can be applied to the user terminal owned by the user who had purchased the content data. (It may be a repaired user terminal that had downloaded the data once but lost it entirely due to failure or other problems or, for example, it may be a user terminal newly bought by the user.)

Figure 8:
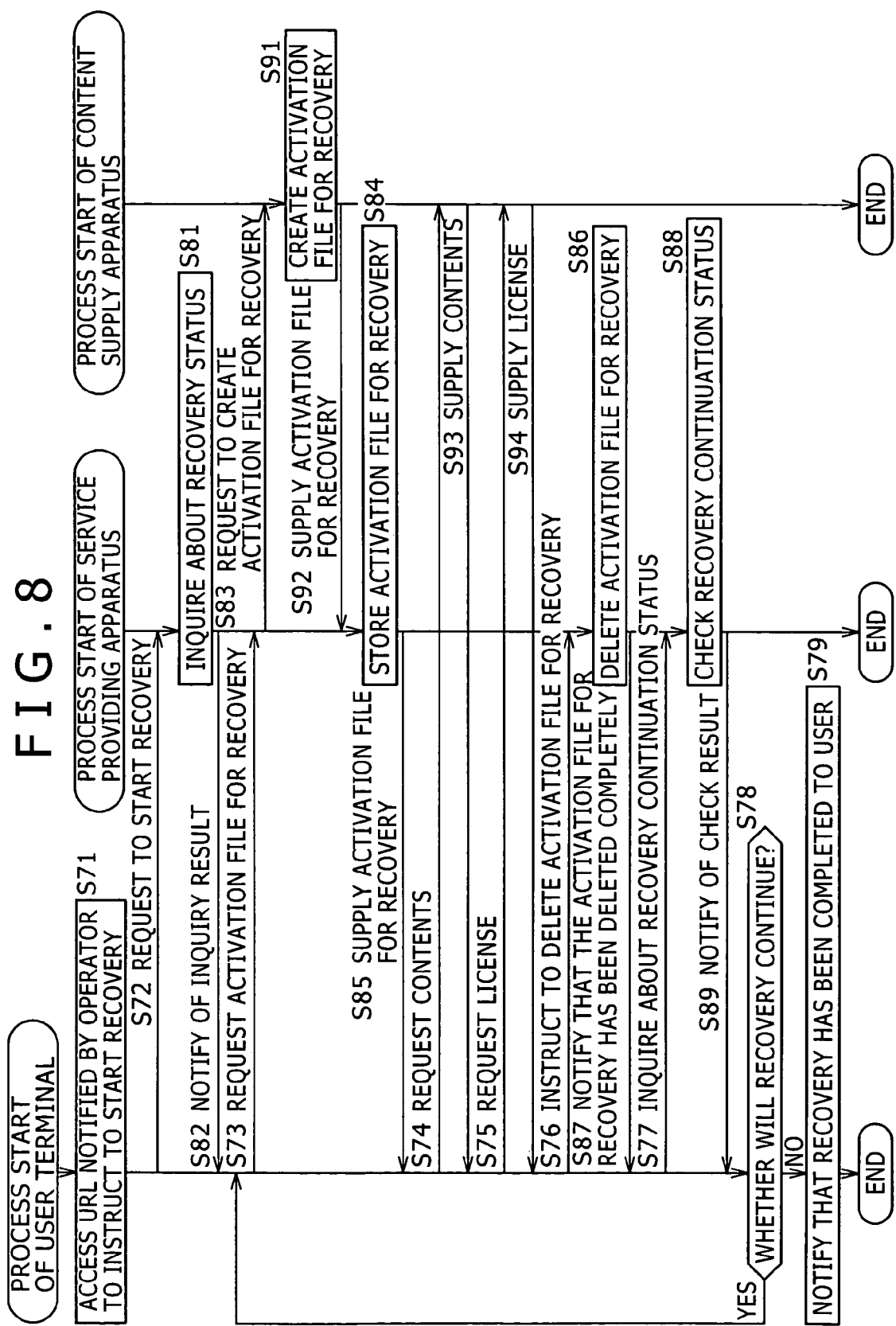
FIG. 8 is a flow chart for describing recovery operations.

Operations for the recovery process of the content supply system will be described with reference to a flow chart of FIG. 8.

First, when the user detects failure of the user terminal 1 or other problems and recognizes the need for the recovery process, as a preparation for this recovery process, the user may have to request the service provider to make the recovery process available. This request may be made via telephone, e-mail, and the like by notifying of information that can identify the user, such as a user ID, a nickname, an e-mail address, a music key number, and the like. If it can be verified that this request is made by the user himself/herself, the operator of the service provider increments by 1 all values of the number of possible recoveries included in the customer information of the user concerned, which is managed by the customer information management section 32 of the service providing apparatus 3, and notifies the user of a URL of a dedicated web page for the user to instruct the start of the recovery process (more specifically, for example, a specified URL of the supervising section 31 of the service providing apparatus 3).

This dedicated web page for the user is provided with a "recovery start button" that appears only when the recovery process is permitted to the user concerned (when the number of possible recoveries is larger than the number of executed recoveries for some content IDs).

In step S71, based on the user's operation, the user terminal 1 accesses the URL notified by the operator of the service provider and displays the dedicated web page established thereon. When the user clicks the "recovery start button" appearing on the web page, in step S72, the user terminal 1 requests the supervising section 31 of the service providing apparatus 3 via the Internet 2 to start the recovery.

In response to this request, in step S81, the supervising section 31 inquires of the customer information management section 32 about the recovery status of the user. More specifically, the supervising section 31 inquires about the content IDs, billing IDs, music key number, and the like of the content data permitted to be recovered (namely, content data having the number of possible recoveries larger than the number of executed recoveries) in the customer information of the user managed by the customer information management section 32. In step S82, the supervising section 31 notifies the user terminal 1 via the Internet 2 of the inquiry result in step S81.

In response to this notification, in step S73, the activation file acquisition section 55 of the user terminal 1 requests via the communication section 58 and the Internet 2 an activation file for recovery for one package of the recoverable content data from the service providing apparatus 3. In response to this request, in step S83, the supervising section 31 of the service providing apparatus 3 requests the content supply apparatus 4 via the Internet 2 to create the activation file for recovery for one package to be recovered. In response to this request, in step S91, the activation file management section 41 of the content supply apparatus 4 creates the activation file for recovery.

In step S92, the activation file management section 41 of the content supply apparatus 4 supplies the generated activation file for recovery to the supervising section 31 of the service providing apparatus 3 via the Internet 2. In step S84, the supervising section 31 outputs the supplied activation file for recovery along with the user ID and other information to the activation file storage section 33 requesting to store the activation file and other information. In response to this request, the activation file storage section 33 stores the activation file for recovery in association with the user ID.

In step S85, the supervising section 31 of the service providing apparatus 3 supplies the activation file for recovery created by the content supply apparatus 4 and stored in the activation file storage section 33 to the user terminal 1 via the Internet 2. The supplied activation file for recovery is stored in the activation file acquisition section 55.

In step S74, the content/license acquisition section 56 of the user terminal 1 accesses the URL for downloading the content data that is described in the music list file for recovery (namely, the content delivery section 42 of the content supply apparatus 4) to request the content data included in the package to be recovered. In response to this request, in step S93, the content delivery section 42 of the content supply system 4 supplies (downloads) the requested content data to the user terminal 1 via the Internet 2. The downloaded content data is stored in the storage section 59 of the user terminal 1. On the other hand, the download determination section 57 of the user terminal 1 determines whether or not the requested content data has been downloaded properly. Till it is determined that the content data has been downloaded properly, the request for the download and the corresponding supply is repeated.

In step S75, the content/license acquisition section 56 of the user terminal 1 accesses the URL for downloading the license data that is described in the activation file for recovery (namely, the license delivery section 43 of the content supply apparatus 4) to request the license data. In response to this request, in step S94, the license delivery section 43 supplies (downloads) the requested license data to the user terminal 1 via the Internet 2. The downloaded license data is stored in the storage section 59 of the user terminal 1.

In step S76, the activation file acquisition section 55 of the user terminal 1 instructs the supervising section 31 of the service providing apparatus 3 via the Internet 2 to delete the activation file for recovery maintained in the service providing apparatus 3. In response to this request, in step S86, based on the control from the supervising section 31, the activation file storage section 33 deletes the stored activation file for recovery. Further, based on the control from the supervising section 31, the customer information management section 32 increments by 1 the number of possible recoveries associated with the content data downloaded properly, which is included in the customer information for the user concerned. At this time, in the customer information for the user, if the number of possible recoveries is equal to the number of executed recoveries for each content ID, there is no content data permitted to be recovered and, therefore, the "recovery start button" does not appear on the web page for recovery dedicated for the user.

In step S87, the supervising section 31 notifies that the stored activation file for recovery has been deleted completely to the user terminal 1 via the Internet 2.

In step S77, the user terminal 1 inquires of the supervising section 31 of the service providing apparatus 3 via the Internet 2 about the recovery continuation status of the user.

In response to this request, in step S88, the supervising section 31 inquires of the customer information management section 32 about the recovery continuation status of the user. More specifically, it is checked whether or not the content IDs of the content data permitted to be recovered are included in the customer information of the user managed by the customer information management section 32. In step S89, the supervising section 31 notifies the user terminal 1 via the Internet 2 of the check result in step S86.

In step S78, based on the result notified by the supervising section 31, the content/license acquisition section 56 of the user terminal 1 determines whether or not to continue the recovery. At this time, if the content IDs of the content data permitted to be recovered are included, it is determined to continue the recovery and, on the contrary, if the content IDs of the content data permitted to be recovered are not included, it is determined not to continue the recovery. If it is determined to continue the recovery in this step S78, the process returns to step S73 and repeats the operations after step S73.

If it is determined not to continue the recovery in step S78, the process proceeds to step S79. In step S79, the information processing section 53 notifies that the recovery process has been completed to the user, for example, by allowing the display section 61 to display a predetermined indication. Thus far, the description of the recovery process by the content supply system has been completed.

Here, it is to be noted that the user can interrupt the recovery process described above at any timing. Further, the recovery process can be restarted from the content data whose download has been interrupted. In particular, when the package whose download has been interrupted includes a plurality of content data, the recovery process can be restarted from any part of the package for each content data.

Figure 9:
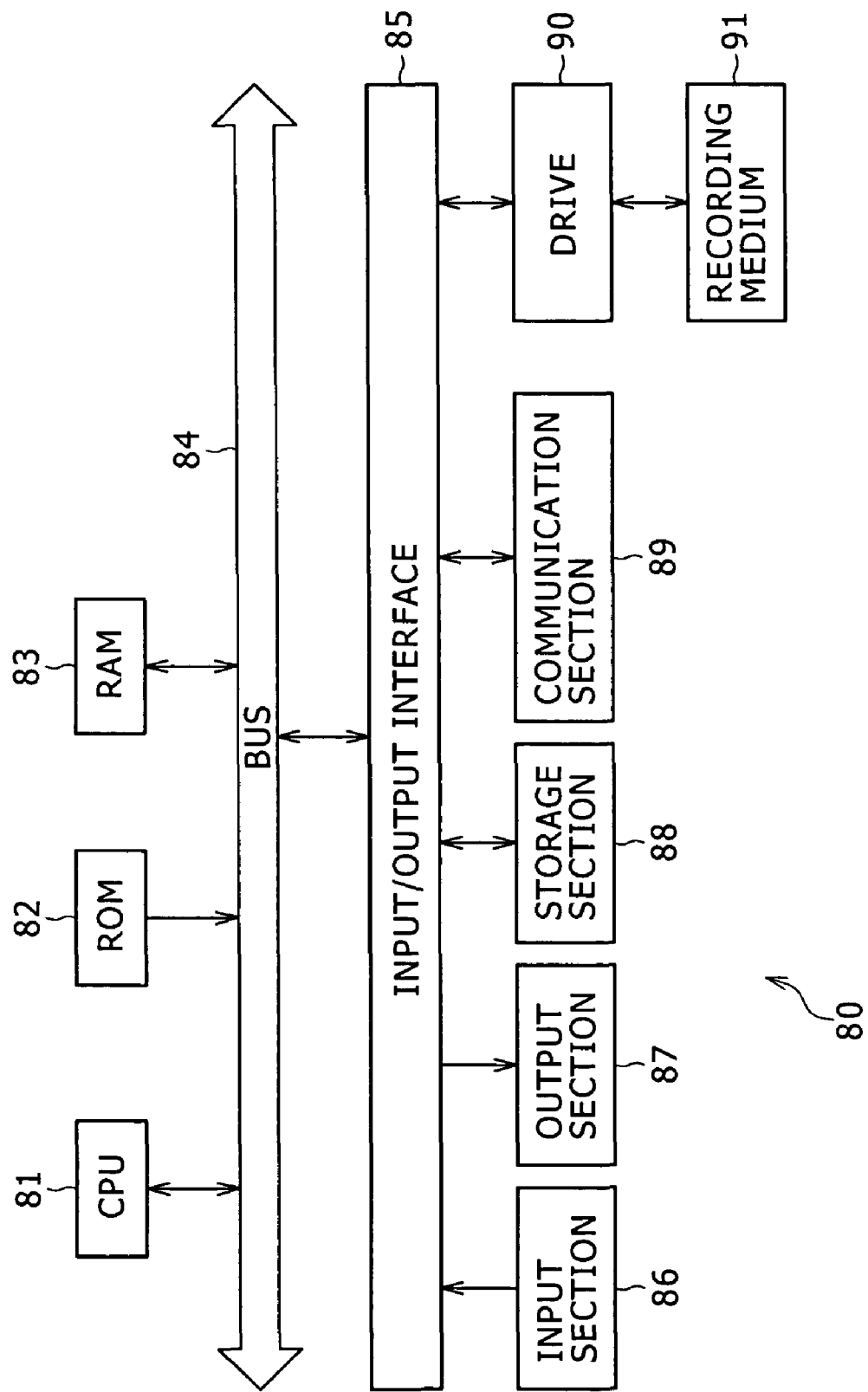
FIG. 9 is a block diagram showing an exemplary configuration of a general-purpose computer.

In this connection, the processes of the user terminal 1, the service providing apparatus 3, and the content supply apparatus 4 described above may be performed by either hardware or software. When the series of processes is performed by software, a program constituting the software is installed from a recording medium on a computer built in dedicated hardware or a general-purpose personal computer such as, for example, the one shown in FIG. 9 that can perform various functions by installing various programs.

This personal computer 80 includes therein a CPU (Central Processing Unit) 81. The CPU 81 is connected to an input/output interface 85 via a bus 84. The bus 84 is connected to a ROM (Read Only Memory) 82 and a RAM (Random Access Memory) 83.

The input/output interface 85 is connected to an input section 86 including input devices such as a keyboard, mouse, and the like for allowing the user to input operation commands, an output section 87 including displays such as a CRT (Cathode Ray Tube) or LCD (Liquid Crystal Display) for displaying images of web pages and so on, a storage section 88 including a hard disk drive and the like for storing content data, license data, and so on, and a communication section 89 including a LAN (Local Area Network) adaptor and the like for performing communication processing via a network, typically, the Internet 2. Further, the input/output interface 85 is connected to a drive 90 for reading/writing data on a recording medium 91 such as a magnetic disk (including a flexible disk), an optical disc (including a CD-ROM (Compact Disc-Read Only Memory), a DVD (Digital Versatile Disc), or a semiconductor memory and so on.

The program for allowing this personal computer to perform the above-described processes, which is stored in the recording medium 91, is supplied to the personal computer and, then, read by the drive 90 and installed on the hard disk drive built in the storage section 88. The program installed in the storage section 88 is loaded from the storage section 88 to the RAM 83 and executed according to instructions from the CPU 81 corresponding to commands input to the input section 86 by the user.

In this specification, the steps performed based on the program include not only processes performed chronologically in the sequence of description but also processes performed not always chronologically but in parallel or separately.

Further, the program may be processed by one computer or may be processed in a distributed manner by a plurality of computers. Still further, the program may be transferred to a remote computer to be executed.

Further, in this specification, the term "system" refers to entire equipment including a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A content supply system for supplying media content from a content supply apparatus to a content reproduction apparatus via a network, wherein the content reproduction apparatus comprises a processor configured to perform a method, the method comprising:

notifying the content supply apparatus via the network of IDs of media content items purchased by a user;

acquiring, from the content supply apparatus, a content list associated with the user of the purchased media content items, the content list indicating whether the purchased media content items have been downloaded by the user completely;

receiving, from the content data supply apparatus, an activation file associated with the user for downloading the purchased media content items;

requesting download of the purchased media content items based on the activation file; and requesting download of the license for the purchased media content items based on the activation file, and the content data supply apparatus comprises a processor configured to perform a method, the method comprising:

managing, for each user of the content reproduction apparatus, customer information including the IDs identifying the purchased media content items and download completion flags corresponding to the IDs indicating whether the purchased media content items have been downloaded by the user to the content reproduction apparatus completely;

generating the content list based on the customer information, the content list associating the IDs of the purchased media content items with the corresponding download completion flags indicating whether the purchased media content items have been downloaded by the user completely;

identifying, based on the IDs of the purchased media content items and the corresponding download completion flags of the content list, media content items purchased by the user but not downloaded completely by the user;

generating the activation file for downloading the identified media content items, the activation file including a first uniform resource locator (URL) for a first site from which the identified media content items can be downloaded and a second URL, different from the first URL, for a site from which the license for the identified media content items can be downloaded;

downloading, to the content reproduction apparatus, the identified media content items using the activation file and in response to the content download request from the content reproduction apparatus; and downloading, to the content reproduction apparatus, the license for the identified media content items using the activation file and in response to the license download request from content reproduction apparatus.

2. A content supply apparatus for supplying media content to a content reproduction apparatus via a network, comprising:
a processor configured to perform a method, the method comprising:
managing, for each user of the content reproduction apparatus, customer information including IDs identifying media content items purchased by the user and download completion flags corresponding to the IDs indicating whether the purchased media content items have been downloaded by the user to the content reproduction apparatus completely;
generating a content list associated with the user based the customer information, the content list associating the IDs with the corresponding download completion flags indicating whether the purchased media content items have been downloaded by the user completely;
identifying, based on the IDs of the purchased media content items and the corresponding download completion flags of the content list, media content items purchased by the user but not downloaded completely by the user;
generating an activation file associated with the user for downloading the identified media content items, the activation file including a first uniform resource locator (URL) for a site from which the purchased media content items can be downloaded and a second URL, different from the first URL, for a site from which a license for the identified media content items can be downloaded;
downloading, to the content reproduction apparatus, the identified media content items using the activation file and in response to a request from the content reproduction apparatus; and
downloading, to the reproduction apparatus, the license for the identified media content items using the activation file and in response to a request from the content reproduction apparatus.

3. A method for supplying media content to a content reproduction apparatus via a network, comprising:
managing, for each user of the content reproduction apparatus, customer information including IDs identifying media content items purchased by the user and download completion flags corresponding to the IDs indicating whether the content items have been downloaded by the user to the content reproduction apparatus completely;
generating a content list associated with the user based on the customer information, the content list associating the IDs of the purchased media content items with the corresponding download completion flags indicating whether the purchased media content items have been downloaded by the user completely;
identifying, based on the IDs of the purchased media content items and the corresponding download completion flags of the content list, media content items purchased by the user but not downloaded completely by the user;
generating an activation file associated with the user for downloading the identified media content items, the activation file including a first uniform resource locator (URL) for a site from which the identified media content items can be downloaded and a second URL for a site from which a license for the identified media content items can be downloaded;
downloading, to the content reproduction apparatus, the identified media content items using the activation file and in response to a request from the content reproduction apparatus; and
downloading, to the content reproduction apparatus, the license for the identified media content items using the activation file and in response to a request from the content reproduction apparatus.

4. A content supply apparatus for supplying media content to a content reproduction apparatus via a network, comprising:
a management section managing, for each user of the content reproduction apparatus, customer information including IDs identifying media content items purchased by the user and download completion flags corresponding to the IDs indicating whether the purchased media content items have been downloaded by the user to the content reproduction apparatus completely;
a content list section generating a content list associated with the user based on the customer information, the content list associating the IDs of the purchased media content items with the corresponding download completion flags indicating whether the purchased media content items have been downloaded by the user completely;
activation file section:
identifying, based on the IDs of the purchased media content items and the corresponding download completion flags of the content list, media content items purchased by the user but not downloaded completely by the user;
generating an activation file associated with the user for downloading the purchased media content items, the activation file including a first uniform resource locator (URL) for a site from which the identified media content items can be downloaded and a second URL, different from the first URL, for a site from which a license for the identified media content items can be downloaded;
a content supplying section downloading the identified media content items, using the activation file, to the content reproduction apparatus;
a license supplying section downloading the license for the identified media content items, using the activation file, to the content reproduction apparatus; and
a processor executing the management section, the content list section, the activation file section, the content supplying section, and the license supplying section.

* * * * *